United States Patent
Koseoglu et al.

(10) Patent No.: US 11,326,112 B1
(45) Date of Patent: May 10, 2022

(54) INTEGRATED HYDROCRACKING/ADSORPTION AND AROMATIC RECOVERY COMPLEX TO UTILIZE THE AROMATIC BOTTOMS STREAM

(71) Applicant: Saudi Arabian Oil Company, Dhahran (SA)

(72) Inventors: Omer Refa Koseoglu, Dhahran (SA); Ali Alzaid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/143,279

(22) Filed: Jan. 7, 2021

(51) Int. Cl.
```
C10G 69/10      (2006.01)
B01J 20/12      (2006.01)
B01J 20/28      (2006.01)
B01D 15/20      (2006.01)
B01D 15/42      (2006.01)
```

(52) U.S. Cl.
CPC .......... *C10G 69/10* (2013.01); *B01D 15/203* (2013.01); *B01D 15/424* (2013.01); *B01J 20/12* (2013.01); *B01J 20/28019* (2013.01); *C10G 2300/202* (2013.01); *C10G 2400/30* (2013.01)

(58) Field of Classification Search
None
See application file for complete search history.

(56) References Cited

U.S. PATENT DOCUMENTS

| | | | |
|---|---|---|---|
| 3,619,407 A | 11/1971 | Hendricks et al. | |
| 4,447,315 A | 5/1984 | Lamb et al. | |
| 4,954,242 A | 9/1990 | Gruia | |
| 4,961,839 A | 10/1990 | Stine et al. | |
| 5,120,427 A | 6/1992 | Stine et al. | |
| 5,139,644 A | 8/1992 | Gruia | |
| 5,139,646 A | 8/1992 | Gruia | |
| 5,276,231 A * | 1/1994 | Kocal ................... | C07C 15/107 585/323 |
| 7,763,163 B2 | 7/2010 | Koseoglu | |

(Continued)

FOREIGN PATENT DOCUMENTS

WO    2004050800 A1    6/2004

OTHER PUBLICATIONS

International Search Report and Written Opinion dated Feb. 18, 2022 pertaining to International application No. PCT/US2021/059912 filed Nov. 18, 2021, 14 pages.

*Primary Examiner* — Tam M Nguyen

(74) *Attorney, Agent, or Firm* — Dinsmore & Shohl LLP

(57) ABSTRACT

In accordance with one or more embodiments of the present disclosure, a process for treating a hydrocarbon feedstream having nitrogen-containing compounds and polynuclear aromatic compounds includes contacting the hydrocarbon feedstream with an adsorbent material; introducing the adsorbent-treated hydrocarbon feedstream to a hydrocracking reaction unit to produce a hydrocracked effluent stream; introducing a naphtha stream to a catalytic reforming unit to produce a reformate stream; introducing the reformate stream to an aromatic recovery complex to produce a light reformate stream, a BTX stream, and an aromatic bottoms stream; and introducing the aromatic bottoms stream to the used adsorbent to release at least a portion of the nitrogen-containing compounds and polynuclear compounds.

12 Claims, 3 Drawing Sheets

(56) References Cited

U.S. PATENT DOCUMENTS

| | | | |
|---|---|---|---|
| 8,343,334 B2 | 1/2013 | Koseoglu | |
| 8,828,219 B2 | 9/2014 | Koseoglu | |
| 9,023,192 B2 | 5/2015 | Koseoglu | |
| 9,388,347 B2 | 7/2016 | Ramaseshan et al. | |
| 9,394,493 B2 | 7/2016 | Koseoglu | |
| 9,534,179 B2 | 1/2017 | Koseoglu | |
| 9,580,663 B2 | 2/2017 | Low et al. | |
| 9,663,732 B2 | 5/2017 | Ganyu | |
| 9,701,912 B2 | 7/2017 | Hoehn et al. | |
| 9,783,748 B2 | 10/2017 | Harvey et al. | |
| 9,803,147 B2 | 10/2017 | Bhattacharya et al. | |
| 9,914,889 B2 | 3/2018 | Hoehn et al. | |
| 9,944,863 B2 | 4/2018 | Zhang et al. | |
| 10,011,786 B1 | 7/2018 | Eizenga et al. | |
| 10,301,560 B2 | 5/2019 | Wang et al. | |
| 10,435,635 B2 | 10/2019 | Hoehn et al. | |
| 10,533,142 B2 | 1/2020 | Sauge et al. | |
| 2008/0093260 A1 | 4/2008 | Koseoglu | |
| 2009/0120842 A1* | 5/2009 | Koseoglu | C10G 25/003 |
| | | | 202/153 |
| 2013/0109895 A1* | 5/2013 | Novak | B01J 20/186 |
| | | | 208/246 |
| 2015/0008159 A1 | 1/2015 | Adams et al. | |
| 2016/0010005 A1* | 1/2016 | Koseoglu | C10B 57/045 |
| | | | 208/45 |
| 2018/0187100 A1 | 7/2018 | Koseoglu | |
| 2020/0377806 A1 | 12/2020 | Koseoglu et al. | |
| 2021/0246386 A1* | 8/2021 | Koseoglu | C10G 45/52 |

\* cited by examiner

INTEGRATED HYDROCRACKING/ADSORPTION AND AROMATIC RECOVERY COMPLEX TO UTILIZE THE AROMATIC BOTTOMS STREAM

FIELD

Embodiments of the present disclosure generally relate to hydrocracking of hydrocarbon oil, and pertain particularly to a process and system for removing polynuclear aromatic compounds from the hydrocarbon feedstream.

TECHNICAL BACKGROUND

Hydrocracking processes are used commercially in a large number of petroleum refineries to process a variety of hydrocarbon feeds boiling in the range of 370° C. to 565° C. in conventional hydrocracking units and boiling at 565° C. and above in residue hydrocracking units. In general, hydrocracking processes split the molecules of the hydrocarbon feed into smaller, i.e., lighter, molecules having higher average volatility and economic value. Additionally, hydrocracking processes typically improve the quality of the hydrocarbon feedstock by increasing the hydrogen-to-carbon ratio and by removing organosulfur and organo nitrogen compounds.

Generally undesirable byproducts of hydrocracking processes include polynuclear aromatic compounds (PNA), having six or fewer fused aromatic rings, and heavy polynuclear aromatic compounds (HPNA), having seven or more fused aromatic rings. The PNA and/or HPNA may cause fouling of refining equipment. As a result, methods of removing PNA and/or HPNA from hydrocracking systems have been developed, including passing a hydrocracked feedstream over an adsorbent material that extracts the PNA and/or HPNA from the hydrocracked feedstream. Such methods may be referred to as "PNA and/or HPNA adsorption processes." In a PNA and/or HPNA adsorption processes, recycling of the adsorbent material by a controlled desorption of the PNA and/or HPNA from the adsorbent material is desirable.

SUMMARY

Therefore, there is a continual need for systems and processes for desorbing PNA and/or HPNA from adsorbent materials in hydrocracking processes. Described herein are processes and systems that allow the aromatic bottoms stream to act as a desorption agent for desorbing PNA and/or HPNA from the adsorbent materials.

According to an embodiment, a process for treating a hydrocarbon feedstream, the hydrocarbon feedstream comprising nitrogen-containing compounds and polynuclear aromatic compounds, includes: (i) contacting the hydrocarbon feedstream with an adsorbent material to produce an adsorbent having an increased content of nitrogen-containing compounds and polynuclear compounds and an adsorbent-treated hydrocarbon feedstream having a decreased content of nitrogen-containing compounds and polynuclear aromatic compounds; (ii) introducing the adsorbent-treated hydrocarbon feedstream to a hydrocracking reaction unit to produce a hydrocracked effluent stream; (iii) introducing a naphtha stream to a catalytic reforming unit to produce a reformate stream; (iv) introducing the reformate stream to an aromatic recovery complex to produce a light reformate stream, a benzene-toluene-xylene (BTX) stream, and an aromatic bottoms stream; and (v) introducing the aromatic bottoms stream to the adsorbent having an increased content of nitrogen-containing compounds and polynuclear compounds to produce an adsorbent having a decreased content of nitrogen-containing compounds and polynuclear compounds and an aromatic bottoms stream having an increased content of nitrogen-containing compounds and polynuclear aromatic compounds.

According to an embodiment, a system for treating a hydrocarbon feedstream, the hydrocarbon feedstream comprising nitrogen-containing compounds and polynuclear aromatic compounds, including: an adsorption zone comprising an adsorbent material for adsorbing at least a portion of the nitrogen-containing compounds and polynuclear aromatic compounds thereby converting the hydrocarbon feedstream into an adsorbent-treated hydrocarbon feedstream having a decreased content of nitrogen-containing compounds and polynuclear aromatic compounds; an aromatic recovery complex for producing an aromatic bottoms stream, the aromatic recovery complex having an outlet that is fluidly coupled to an inlet of the adsorption zone; and a conduit in fluid communication with the outlet of the aromatic recovery complex and the inlet of the adsorption zone for conveying at least a portion of the aromatic bottoms stream to the adsorption zone for desorbing the nitrogen-containing compounds and polynuclear aromatic compounds from the adsorbent materials.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Figure 1:
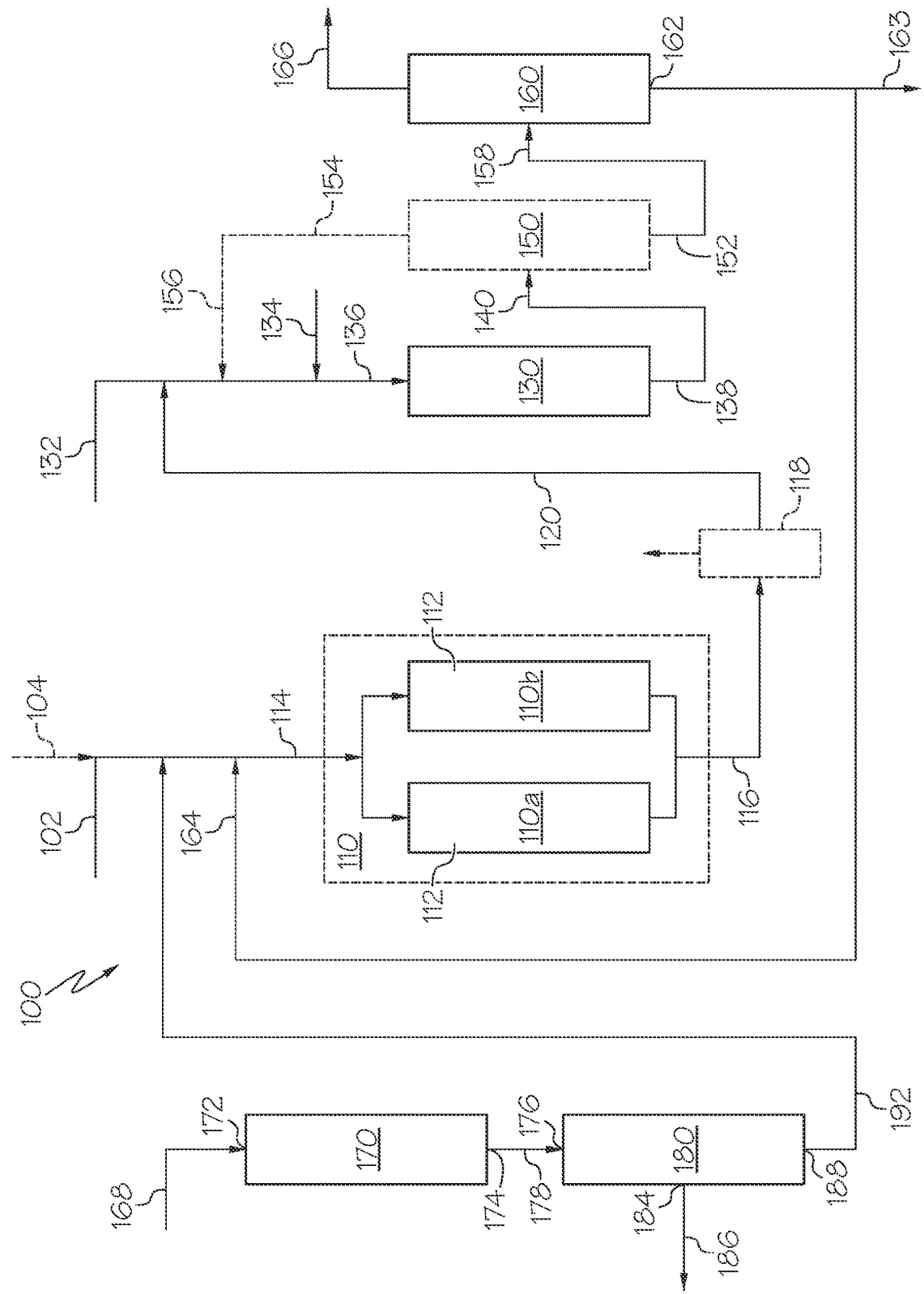
FIG. 1 depicts a process flow diagram of an integrated hydrocracking apparatus in accordance with embodiments described herein.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), deasphalted oil (DAO) obtained from a solvent deasphalting process, demetallized oil (DMO), light and/or heavy coker gas oil obtained from a coker process, cycle oil obtained from a fluid catalytic cracking (FCC) process, and gas oil obtained from a visbreaking process.

As used herein, the term "hydrocarbon" refers to a chemical compound composed entirely of carbon and hydrogen atoms. An expression such as "$C_x$-$C_y$ hydrocarbon" refers to a hydrocarbon having from x to y carbon atoms. For instance, a $C_1$-$C_5$ hydrocarbon includes methane, ethane, propane, the butanes, and the pentanes.

As used herein, the term "hydrogen/oil ratio" or "hydrogen-to-oil ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed.

As used herein, the term "liquid hourly space velocity" or "LHSV" refers to the ratio of the liquid flow rate of the hydrocarbon feed to the catalyst volume or mass.

As used herein, the term "conduit" includes casings, liners, pipes, tubes, coiled tubing, and mechanical structures with interior voids.

As used herein, the term "decreased content" of a substance means that a concentration of the substance is greater before passing through a stage of the process under examination than it is after passing through the stage. As used herein, the term "increased content" of a substance means that a concentration of the substance is greater after passing through a stage of the process under examination than it is before passing through the stage.

The overall Hildebrand solubility parameter, which has been calculated for numerous compounds, is a well-known measure of polarity and is believed to be derived from the cohesive energy density of the solvent, which in turn is derived from the heat of vaporization. See Joel H. Hildebrand, Journal of Paint Technology, Vol. 39, No. 505, February 1967. Without intending to be bound by any particular theory, it is believed that when a liquid is heated to its boiling point, energy is added to the liquid, resulting in an increase in the temperature of the liquid. Once the liquid reaches its boiling point, however, the further addition of heat does not cause a further increase in temperature. The energy that is added is entirely used to separate the molecules of the liquid and boil them away into a gas. If the amount of energy (in calories) added from the onset of boiling to the point when all the liquid has boiled away is measured, the measurement will provide a direct indication of the amount of energy required to separate the liquid into a gas, and thus the amount of van der Waals forces that held the molecules of the liquid together. A liquid with a low boiling point may require considerable energy to vaporize, while a liquid with a higher boiling point may vaporize quite readily, or vice versa. The energy required to vaporize the liquid is called the heat of vaporization. From the heat of vaporization, in calories per cubic centimeter of liquid, the cohesive energy density of the liquid may be calculated as follows:

$$c = \frac{\Delta H - (R * T)}{V_m}$$

where c is the cohesive energy density in MPa; ΔH is the heat of vaporization; R is the gas constant; T is the temperature; and $V_m$ is the molar volume. The Hildebrand solubility factor, δ, is the square root of the cohesive energy density. The Hildebrand solubility factors are known for several solvents. However, such Hildebrand solubility factors were not readily available for the aromatic bottoms stream, which have now been calculated and reported herein. Table 1 provides known Hildebrand solubility factors for conventional solvents, heptane, n-dodecane, and benzene, and such factors calculated for kerosene, light gas oil, and two varieties of aromatic bottoms. It is believed that the aromatics bottom stream may have a Hildebrand solubility factor of at least 19 $MPa^{1/2}$, such as from 19 $MPa^{1/2}$ to 22 $MPa^{1/2}$.

TABLE 1

Hildebrand Solubility Factors for Various Solvents and Refining Products

| Solvent | Δ ($MPa^{1/2}$) |
| --- | --- |
| Heptane | 15.3 |
| n-Dodecane | 16.0 |
| Benzene | 18.7 |
| Kerosene | 16.3 |
| Light gas oil | 15.7 |
| Aromatic Bottoms (full range) | 20.7 |
| Aromatic Bottoms (≥180° C. fraction) | 21.2 |

Referring now to FIG. 1, a process flow diagram of an integrated hydrocracking apparatus 100 including feed/bottoms treatment is provided. Apparatus 100 includes an adsorption zone 110, a hydrocracking reaction zone 130 containing hydrocracking catalysts, an optional high-pressure separation zone 150, a fractionating zone 160, a catalytic reforming unit 170, and an aromatic recovery complex 180.

Adsorption zone 110 includes an inlet 114 in fluid communication with a source of a first heavy hydrocarbon feedstream via a conduit 102, and hydrocracking reaction product fractionator bottoms via a conduit 164, which is in fluid communication with an unconverted/partially converted fractionator bottoms outlet 162 of fractionating zone 160. In addition, adsorption zone 110 includes a cleaned feedstream outlet 116 in fluid communication with an inlet 136 of hydrocracking reaction zone 130 via a conduit 120.

Feed inlet 136 of hydrocracking zone 130 may also be in fluid communication with an optional source of a second heavy hydrocarbon feedstream via a conduit 132. In addition, inlet 136 is in fluid communication with a source of hydrogen via a conduit 134 and optionally a hydrogen recycle stream from outlet 154 of high-pressure separation zone 150 via a conduit 156 for recovering excess hydrogen. An outlet 138 of hydrocracking reaction zone 130 may be in fluid communication with an inlet 140 of high-pressure separation zone 150. In embodiments in which there is not an excess of hydrogen to be recovered, i.e., stoichiometric or near-stoichiometric hydrogen feed is provided, high pressure separation zone 150 can be bypassed or eliminated, and outlet 138 of hydrocracking reaction zone 130 may be in fluid communication with inlet 158 of the fractionating zone 160. However, in addition to excess hydrogen, high pressure separation zone 150 may also be used to remove other gases, such as hydrogen sulfide and $C_1$ to $C_4$ gases.

High-pressure separation zone 150 includes an outlet 152 in fluid communication with an inlet 158 of the fractionating zone 160 for conveying cracked, partially cracked and unconverted hydrocarbons, and an outlet 154 in fluid communication with inlet 136 of the hydrocracking reaction zone 130 for conveying recycle hydrogen. Fractionating zone 160 further includes outlet 162 in fluid communication with inlet 114 of adsorption zone 110 and a bleed outlet 163, and an outlet 166 to discharge cracked product. In embodiments, fractionating zone 160 splits the hydrocracker products into several fractions. For instance, fractionating zone 160 may split the hydrocracker products into light naphtha (products from the initial boiling point to 75° C.), heavy naphtha (boiling from 75° C. to 180° C.), kerosene (boiling from 180° C. to 250°), diesel (boiling from 250° C. to 375° C.), and unconverted oil (boiling at 375° C. and above).

Figure 2:
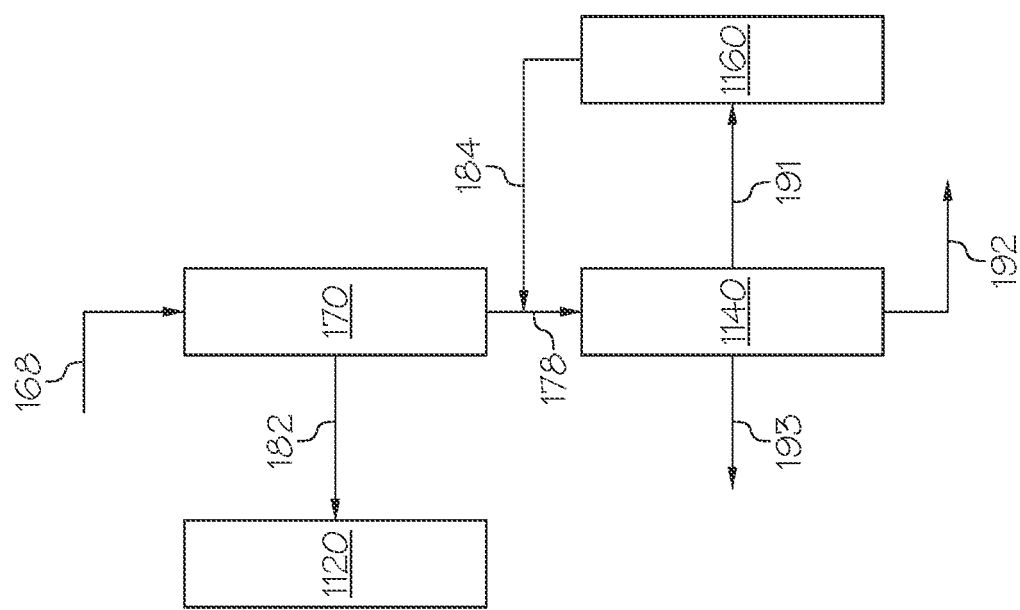
FIG. 2 depicts a process flow diagram of an aromatic recovery complex in accordance with embodiments described herein.

Aromatic bottoms used for desorption are prepared as follows. Naphtha feed is in fluid communication with inlet 172 of catalytic reforming unit 170 through conduit 168. The product of the reforming unit 170, the reformate, is in fluid communication with outlet 174 of catalytic reforming unit 170 and inlet 176 of aromatic recovery complex 180 through conduit 178. In embodiments, the reformate stream includes aromatics, alkyl aromatics, naphthenes, olefins, and iso-paraffins. Aromatic recovery complex 180 separates the reformate into benzene, toluene, xylene, non-aromatic raffinate, and aromatic bottoms. Referring to FIG. 2, in a typical refinery with an aromatic recovery complex 180, the reformate from catalytic reforming unit 170 is processed in an aromatic recovery complex 180 to recover high value aromatics, i.e., benzene, toluene, and xylenes (commonly called BTX). The reformate from the catalytic reforming unit 170 is split into two fractions: light reformate and heavy reformate or BTX stream. As used herein, the term "light reformate" refers to a fraction of the reformate with a carbon number $C_5$-$C_6$. As used herein, the term "heavy reformate" refers to a fraction of the reformate with a carbon number $C_7$ or higher. The light reformate stream is sent to a benzene extraction unit 1120 through conduit 182 to extract the benzene and recover gasoline that is substantially free of benzene. As used in this context, "substantially free of benzene" means that the gasoline contains 1% by volume (vol. %) or less of the benzene, or 0.75 vol. % or less of the benzene, or 0.5 vol. % or less of the benzene, or 0.25 vol. % or less of the benzene, or 100 parts per million by volume (ppmv) or less of the benzene, or 75 ppmv or less of the benzene, or 50 ppmv or less of the benzene, or 25 ppmv or less of the benzene. The heavy reformate stream optionally may be split into a $C_7$ stream and a $C_8$ and higher stream. The $C_7$ stream may be used as a gasoline blending composition or directed to a transalkylation unit, as described in U.S. Pre-Grant Publication No. 2020/0062675, the entire content of which is incorporated herein by reference. The $C_8$ and higher stream may be deolefinated and sent to a p-xylene extraction unit 1140 through conduit 178 to recover p-xylene, which exits p-xylene extraction unit 1140 through conduit 193. Other xylenes are recovered and sent to a xylene isomerization unit 1160 through conduit 191 to convert them to p-xylene. The converted fraction is recycled back to the p-xylene extraction unit 1140 via conduit 184. The heavy fraction stream 192 from the p-xylene extraction unit 1140 is recovered as process reject or bottoms, including aromatic bottoms.

Without intending to be bound by any particular theory, it is believed that the aromatic bottoms form as follows. Because olefins are detrimental in the extraction and adsorption process within an aromatic recovery complex, they are usually removed using a clay tower or by selective hydrogenation. Due to the acidic nature of the clays, olefinic aromatics, such as styrene, react with another aromatic molecule via an alkylation reaction to form bridged di-aromatic molecules. After the separation of $C_6$ to $C_8$ aromatics, these di-aromatic molecules remain in the process reject or bottoms stream of the aromatic complex, which stream is a low quality stream and may be used to obtain gasoline blending components. The aromatic bottoms stream has a high Hildebrand solubility factor and can be used to dissipate the PNA compounds in the hydrocracking reactor outlets, thus minimizing or eliminating deposition of such molecules downstream of the reactor, usually at the heat exchangers.

An exemplary aromatic bottoms stream has a density of 0.9819 g/ml, and in some embodiments, the components of the aromatic bottoms stream may have an initial boiling point of less than or equal to 198° C., a T10 true boiling point (TBP), referring to when at least 10% of the aromatic bottoms fraction has evaporated, of less than or equal to 211° C., a T30 TBP of less than or equal to 236° C., a T50 TBP of less than or equal to 274° C., a T70 TBP of less than or equal to 302° C., a T90 TBP of less than or equal to 329° C., and a final boiling point of less than or equal to 400° C. An analysis of an exemplary aromatic bottoms stream provides the composition shown in Table 1. In embodiments, the aromatic bottoms stream comprises at least one compound selected from the group consisting of alkylated mono-aromatics, uncondensed bridged di-aromatics, condensed di-aromatics, alkylated mono-aromatics, and mixtures of two or more thereof.

TABLE 1

| Components of an exemplary aromatic bottoms stream | |
|---|---|
| Component | Amount (wt. %) |
| Paraffins | 0.1 |
| Mono-naphthenes | 0.1 |
| Di-naphthenes | 0.1 |
| Mono-aromatics | 10.75 |
| Naphtheno-mono-aromatics | 12.1 |
| Di-aromatics | 65.8 |
| Naphtheno-di-aromatics | 6.9 |
| Tri/tetra-aromatics | 4.3 |
| BTX | 0.1 |

Referring again to FIG. 1, the BTX stream is in fluid communication with outlet 184 of aromatic recovery complex 180 through conduit 186, to be collected for further processing. The aromatic bottoms stream is in fluid communication with outlet 188 of aromatic recovery complex 180 and inlet 114 of adsorption zone 110 through conduit 192.

In operation of the system 100, a combined stream including a first heavy hydrocarbon feedstream via conduit 102 and a hydrocracking reaction bottoms stream via conduit 164, and optionally solvent via conduit 104 from fractionating zone 160 or from another source, are introduced into the adsorption zone 110 via inlet 114. Solvent can be optionally used to facilitate elution of the feedstock mixture over the adsorbent. The concentrations of nitrogen-containing compounds, sulfur-containing compounds, and HPNA compounds present in the hydrocarbon feedstream are reduced in the adsorption zone 110 by contact with adsorbent 112. The HPNA compounds may include 7 or more, 8 or more, 9 or more, or even 10 or more fused aromatic rings.

An adsorbent-treated hydrocracking feedstream is discharged from adsorption zone 110 via outlet 116 and conveyed to inlet 136 of hydrocracking reaction zone 130 via and conduit 120, along with the second hydrocarbon feedstream which optionally may be introduced into inlet 136 of hydrocracking reaction zone 130 via conduit 132. In embodiments in which elution solvent is utilized, it is distilled and recovered in fractionator 118.

An effective quantity of hydrogen for hydrocracking reactions is provided via conduits 134 and optionally recycle hydrogen conduit 156. Hydrocracking reaction effluents are discharged from outlet 138 of hydrocracking reaction zone 130. The hydrocracking reaction effluents are conveyed to inlet 140 of high-pressure separation zone 150. A gas stream, which mainly contains hydrogen, but may also contain other gases such as $C_1$ to $C_4$ hydrocarbons, $H_2S$, and $NH_3$, is separated from the converted, partially converted and unconverted hydrocarbons in the high-pressure separation zone 150, and is discharged via outlet 154 and recycled to hydrocracking reaction zone 130 via conduit 156. Converted, partially converted, and unconverted hydrocarbons, which includes HPNA compounds formed in the hydrocracking reaction zone 130, are discharged via outlet 152 to inlet 158 of fractionating zone 160. A cracked product stream is discharged via outlet 166 and can be further processed and/or blended in downstream refinery operations to produce gasoline, kerosene and/or diesel fuel. At least a portion of the fractionator bottoms from the hydrocracking reaction effluent, including HPNA compounds formed in the hydrocracking reaction zone 130, are discharged from outlet 162 and are recycled to adsorption zone 110 via conduit 164. A portion of the fractionator bottoms from the hydrocracking reaction effluent is removed from bleed outlet 163 to remove a portion of the HPNA compounds, which could cause equipment fouling. The concentration of HPNA compounds in the hydrocracking effluent fractionator bottoms is reduced in adsorption zone 110. For instance, the concentration of HPNA compounds prior to passing through the adsorption zone 110 may be from 10 parts per million by weight (ppmw) to 10000 ppmw, from 10 ppmw to 9000 ppmw, from 10 ppmw to 8000 ppmw, from 10 ppmw to 7000 ppmw, from 10 ppmw to 6000 ppmw, from 10 ppmw to 5000 ppmw, from 10 ppmw to 4000 ppmw, from 10 ppmw to 3000 ppmw, from 10 ppmw to 2000 ppmw, from 10 ppmw to 1000 ppmw, from 10 ppmw to 900 ppmw, from 10 ppmw to 800 ppmw, from 10 ppmw to 700 ppmw, from 10 ppmw to 600 ppmw, from 10 ppmw to 500 ppmw, from 10 ppmw to 400 ppmw, from 10 ppmw to 300 ppmw, from 10 ppmw to 200 ppmw, from 10 ppmw to 100 ppmw, from 100 ppmw to 10000 ppmw, from 200 ppmw to 10000 ppmw, from 300 ppmw to 10000 ppmw, from 400 ppmw to 10000 ppmw, from 500 ppmw to 10000 ppmw, from 600 ppmw to 10000 ppmw, from 700 ppmw to 10000 ppmw, from 800 ppmw to 10000 ppmw, from 900 ppmw to 10000 ppmw, from 1000 ppmw to 10000 ppmw, from 2000 ppmw to 10000 ppmw, from 3000 ppmw to 10000 ppmw, from 4000 ppmw to 10000 ppmw, from 5000 ppmw to 10000 ppmw, from 6000 ppmw to 10000 ppmw, from 7000 ppmw to 10000 ppmw, from 8000 ppmw to 10000 ppmw, or even from 9000 ppmw to 10000 ppmw. Further, the concentration of HPNA adsorbent-treated hydrocarbon feedstream may be from 0 ppmw to 500 ppmw, from 0 ppmw to 450 ppmw, from 0 ppmw to 400 ppmw, from 0 ppmw to 350 ppmw, from 0 ppmw to 300 ppmw, from 0 ppmw to 250 ppmw, from 0 ppmw to 200 ppmw, from 0 ppmw to 150 ppmw, from 0 ppmw to 100 ppmw, from 0 ppmw to 90 ppmw, from 0 ppmw to 80 ppmw, from 0 ppmw to 70 ppmw, from 0 ppmw to 60 ppmw, from 0 ppmw to 50 ppmw, from 0 ppmw to 40 ppmw, from 0 ppmw to 30 ppmw, from 0 ppmw to 20 ppmw, from 0 ppmw to 10 ppmw, from 10 ppmw to 500 ppmw, from 20 ppmw to 500 ppmw, from 30 ppmw to 500 ppmw, from 40 ppmw to 500 ppmw, from 50 ppmw to 500 ppmw, from 60 ppmw to 500 ppmw, from 70 ppmw to 500 ppmw, from 80 ppmw to 500 ppmw, from 90 ppmw to 500 ppmw, from 100 ppmw to 500 ppmw, from 150 ppmw to 500 ppmw, from 200 ppmw to 500 ppmw, from 250 ppmw to 500 ppmw, from 300 ppmw to 500 ppmw, from 350 ppmw to 500 ppmw, from 400 ppmw to 500 ppmw, or even from 450 ppmw to 500 ppmw. In particular, in system 100, both the hydrocracking reaction fractionator bottoms and the first heavy hydrocarbon feedstream are combined and contacted with adsorbent material 112 in adsorption zone 110. The adsorbent-treated hydrocracking feed may optionally be combined with the second heavy hydrocarbon feedstream for cracking in the hydrocracking reaction zone 130.

In certain embodiments, the adsorption zone includes columns that are operated in swing mode so that production of the cleaned feedstock is continuous. When the adsorbent material 112 in column 110 *a* or 110 *b* becomes saturated with adsorbed nitrogen-containing compounds, sulfur-containing compounds, and/or HPNA compounds, the flow of the combined feedstream is directed to the other column. The adsorbed compounds are desorbed by the aromatic bottoms stream produced by catalytic reforming unit 170 and aromatic recovery complex 180. In embodiments, the aromatics bottom stream may have a Hildebrand solubility factor of at least 19 $MPa^{1/2}$, such as from 19 $MPa^{1/2}$ to 22 $MPa^{1/2}$. An aromatic bottoms stream having an increased content of nitrogen-containing compounds and PNA compounds is thereby provided, which may then be conveyed to a fuel oil pool or other process units to separate adsorbed species from the aromatic bottoms solvent.

In embodiments, the desorption step is not performed by solvent desorption or heat desorption. Solvent desorption is typically performed using polar solvents or non-polar solvents. The non-polar solvents typically have an overall Hildebrand solubility parameter of less than or equal to 16 $MPa^{1/2}$. Suitable non-polar solvents include, e.g., saturated aliphatic hydrocarbons such as pentanes, hexanes, heptanes, paraffinic naphtha, $C_5$-$C_{11}$, kerosene $C_{12}$-$C_{15}$, diesel $C_{16}$-$C_{20}$, normal and branched paraffins, and mixtures or any of these solvents. Polar solvents typically have a Hildebrand solubility parameter greater than or equal to about 16.5 $MPa^{1/2}$ and include (with the Hildebrand solubility factor given in parentheses) toluene (18.31 $MPa^{1/2}$), benzene (18.7 $MPa^{1/2}$), xylenes (18.25 $MPa^{1/2}$), and tetrahydrofuran (18.5 $MPa^{1/2}$).

Figure 3:
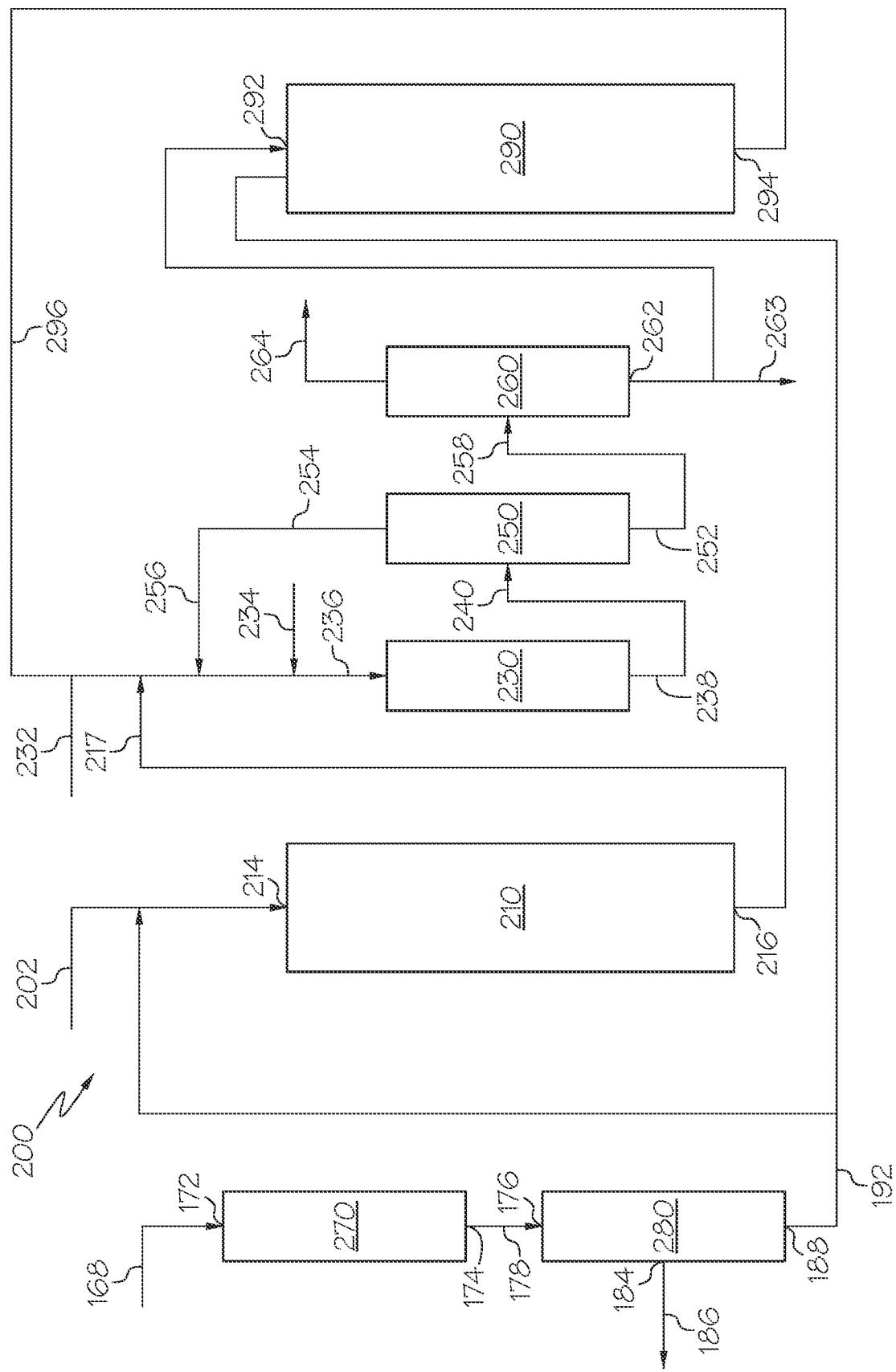
FIG. 3 depicts a process flow diagram of an integrated hydrocracking apparatus having two adsorption zones in accordance with embodiments described herein.

Referring to FIG. 3, a process flow diagram of an integrated hydrocracking apparatus 200 including feed pretreatment and bottoms treatment is provided. Apparatus 200 includes a first adsorption zone 210, a hydrocracking reaction zone 230 containing hydrocracking catalysts, a high-pressure separation zone 250, a fractionating zone 260, a catalytic reforming unit 270, an aromatic recovery complex 280, and a second adsorption zone 290.

First adsorption zone 210 includes an inlet 214 in fluid communication with a source of first heavy hydrocarbon feedstream via a conduit 202 (and optionally a source of solvent as described with respect to FIG. 1, not shown in FIG. 3), and a cleaned feedstream outlet 216 in fluid communication with an inlet 236 of hydrocracking reaction zone 230 via a conduit 217.

Feed inlet 236 of hydrocracking reaction zone 230 optionally may also be in fluid communication with a source of second hydrocarbon feedstream via a conduit 232. In addition, inlet 236 is in fluid communication with a source of hydrogen via a conduit 234 and hydrogen recycle stream from outlet 254 of high-pressure separation zone 250 via a conduit 256. As noted with respect to the discussion of apparatus 100 in FIG. 1, the high pressure separation zone can be bypassed or eliminated, for instance, if there is little or no excess hydrogen. However, in addition to excess hydrogen, high pressure separation zone 250 may also be used to remove other gases, such as hydrogen sulfide and $C_1$ to $C_4$ gases. Hydrocracking reaction zone 230 includes an outlet 238 in fluid communication with an inlet 240 of high-pressure separation zone 250.

High-pressure separation zone 250 also includes an outlet 252 in fluid communication with an inlet 258 of fractionating zone 260 for conveying cracked, partially cracked and unconverted hydrocarbons, and an outlet 254 in fluid communication with the hydrocracking reaction zone 230 for conveying recycle hydrogen. Fractionating zone 260 further includes outlet 262 in fluid communication with inlet 292 of second adsorption zone 290, and an outlet 264 to discharge cracked product. In embodiments, fractionating zone 260 splits the hydrocracker products into several fractions. For instance, fractionating zone 260 may split the hydrocracker products into light naphtha (products from the initial boiling point to 75° C.), heavy naphtha (boiling from 75° C. to 180° C.), kerosene (boiling from 180° C. to 250°), diesel (boiling from 250° C. to 375° C.), and unconverted oil (boiling at 375° C. and above).

Second adsorption zone 290 includes inlet 292 in fluid communication with fractionating zone outlet 262 (and optionally a source of solvent as described with respect to FIG. 1, not shown in FIG. 3), and an outlet 294 in fluid communication with inlet 236 of hydrocracking reaction zone 230 via a conduit 296.

Aromatic bottoms used for desorption are prepared as follows. Naphtha feed is in fluid communication with inlet 172 of catalytic reforming unit 270 through conduit 168. The reformate is in fluid communication with outlet 174 of catalytic reforming unit 270 and inlet 176 of aromatic recovery complex 280 through conduit 178. Aromatic recovery complex 280 separates the reformate into benzene, toluene, xylene, and aromatic bottoms. The benzene, toluene, and xylene (together "BTX") are in fluid communication with outlet 184 of aromatic recovery complex 280 through conduit 186, to be collected for further processing. The aromatic bottoms stream is in fluid communication with outlet 188 of aromatic recovery complex 180 and inlet 214 of first adsorption zone 210 through conduit 192 and/or inlet 292 of second adsorption zone 290.

In operation of the system 200, a first heavy hydrocarbon feedstream is conveyed via conduit 202 to inlet 214 of first adsorption zone 210. The concentrations of nitrogen-containing compounds, sulfur-containing compounds and HPNA compounds in the first heavy hydrocarbon feedstream are reduced in first adsorption zone 210.

An adsorbent-treated first heavy hydrocarbon feedstream is discharged from outlet 216 of adsorption zone 210 and conveyed to inlet 236 of hydrocracking reaction zone 230 via conduit 217. A second hydrocarbon feedstream is also introduced into the hydrocracking reaction zone 230 via conduit 232. An effective quantity of hydrogen for hydrocracking reactions is provided via conduits 234, 256. Hydrocracked effluents are discharged via outlet 238 to inlet 240 of high-pressure separation zone 250. The high-pressure separation zone 250 operates at a pressure similar to that of the hydrocracking reaction zone 230. However, from 0.2 MPa to 1 MPa of pressure may be lost in the high-pressure separation zone 250 depending on the number of heat exchange units used in the high-pressure separation zone 250. For example, approximately 0.06 MPa of pressure may be lost per heat exchanger used. In embodiments, the high-pressure separation zone 250 may be operated at a temperature from 220° C. to 260° C., from 230° C. to 260° C., from 240° C. to 260° C., from 250° C. to 260° C., from 220° C. to 250° C., from 220° C. to 240° C., or even from 220° C. to 230° C.

A gas stream, which primarily contains hydrogen, is separated from the converted, partially converted and unconverted hydrocarbons in the high-pressure separation zone 250, and is discharged via outlet 254 and recycled to hydrocracking reaction zone 230 via conduit 256 as-is or after purification to hydrogen sulfide and/or $C_1$ to $C_4$ gases, when present. Converted, partially converted and unconverted hydrocarbons, including HPNA compounds formed in the hydrocracking reaction zone 230, are discharged via outlet 252 to inlet 258 of fractionating zone 260. A cracked product stream is discharged via outlet 264 and can be further processed and/or blended in downstream refinery operations to produce gasoline, kerosene and/or diesel fuel. Unconverted and partially cracked fractionator bottoms, including HPNA compounds formed in the hydrocracking reaction zone 230, are discharged from outlet 262 and at least a portion thereof is conveyed to inlet 292 of second adsorption zone 290, with the remainder removed via a bleed outlet 263. The concentration of HPNA compounds in the unconverted fractionator bottoms is reduced in the second adsorption zone 290, thereby improving the quality of the recycle stream. Adsorbent-treated unconverted fractionator bottoms are sent to the hydrocracking reaction zone 230 via outlet 294 in fluid communication with inlet 236 for further cracking. The adsorbed compounds in first adsorption zone 210 and second adsorption zone 290 are desorbed by the aromatic bottoms stream produced by catalytic reforming unit 270 and aromatic recovery complex 280.

By employing distinct adsorption zones 210, 290, the content of the individual feeds to these adsorption zones can be specifically targeted. That is, nitrogen-containing compounds, sulfur-containing compounds and HPNA compounds from the initial feed can be removed in the first adsorption zone 210 under a first set of operating conditions and using a first adsorbent material, and HPNA compounds formed during the hydrocracking process can be removed in the second adsorption zone 290 under a second set of operating conditions and using a second adsorbent material. Further, the first adsorption zone 210 and second adsorption zone 290 may undergo desorption with the aromatic bottoms stream either simultaneously or independently.

The feedstreams for use in above-described systems and processes may be a partially refined oil product obtained from various sources. In general, the first heavy feedstream is one or more of VGO from a vacuum distillation operation, DMO from a solvent demetalizing operation or DAO from a solvent deasphalting operations, coker gas oils from coker operations, cycle oils from fluid catalytic cracking operations, visbroken oils from visbreaking operations. The first heavy feedstream generally has a boiling point of from 350° C. to 800° C., and in certain embodiments of from 500° C. to 700° C.

The second heavy hydrocarbon feedstream is generally VGO from a vacuum distillation operation and contains hydrocarbons having a boiling point of from 350° C. to 600° C., and in certain embodiments from 350° C. to 570° C.

Suitable reaction apparatuses for the hydrocracking reaction zone include fixed bed reactors, moving bed reactors, ebullated bed reactors, baffle-equipped slurry bath reactors, stirring bath reactors, rotary tube reactors, slurry bed reactors, or other suitable reaction apparatuses as appreciated by one of ordinary skill in the art. In certain embodiments, for example for VGO and similar feedstreams, fixed bed reactors are utilized. In additional embodiments, for example for heavier feedstreams and other difficult to crack feedstreams, ebullated bed reactors are utilized. In embodiments, the hydrocracker may perform single-stage once through hydrocracking, series flow hydrocracking with recycle, series flow hydrocracking without recycle, or two stage recycle hydrocracking to produce the hydrocracked effluent stream.

In general, the operating conditions for the reactor of a hydrocracking zone include: reaction temperature of 300° C. to 500° C., in certain embodiments 330° C. to 475° C., and in further embodiments 330° C. to 450° C.; hydrogen partial pressure of 60 kg/cm² to 300 kg/cm², in certain embodiments 100 kg/cm² to 200 kg/cm², and in further embodiments 130 kg/cm² to 180 kg/cm²; liquid hourly space velocity of 0.1 h⁻¹ to 10 h⁻¹, in certain embodiments 0.25 h⁻¹ to 5 h⁻¹, and in further embodiments 0.5 h⁻¹ to 2 h⁻¹; hydrogen/oil ratio of 500 normalized m³ per m³ (Nm³/m³) to 2500 Nm³/m³, in certain embodiments 800 Nm³/m³ to 2000 Nm³/m³, and in further embodiments 1000 Nm³/m³ to 1500 Nm³/m³.

In certain embodiments, the hydrocracking catalyst includes any one of or combination including amorphous alumina catalysts, amorphous silica alumina catalysts, titania catalysts, natural or synthetic zeolite based catalyst, or a combination thereof. The hydrocracking catalyst can possess an active phase material including, in certain embodiments, any one of or combination including Ni, W, Mo, or Co. In certain embodiments in which an objective is hydrodenitrogenation, acidic alumina or silica-alumina or titania based catalysts loaded with Ni—Mo or Ni—W active metals, or combinations thereof, are used. In embodiments in which the objective is to remove all nitrogen and to increase the conversion of hydrocarbons, silica-alumina, zeolite, or combination thereof are used as catalysts, with active metals including Ni—Mo, Ni—W or combinations thereof.

In embodiments, the catalytic reforming unit may be operated at a temperature from 260° C. to 560° C., from 270° C. to 560° C., from 280° C. to 560° C., from 290° C. to 560° C., from 300° C. to 560° C., from 310° C. to 560° C., from 320° C. to 560° C., from 330° C. to 560° C., from 340° C. to 560° C., from 350° C. to 560° C., from 360° C. to 560° C., from 370° C. to 560° C., from 380° C. to 560° C., from 390° C. to 560° C., from 400° C. to 560° C., from 410° C. to 560° C., from 420° C. to 560° C., from 430° C. to 560° C., from 440° C. to 560° C., from 450° C. to 560° C., from 455° C. to 560° C., from 460° C. to 560° C., from 465° C. to 560° C., from 470° C. to 560° C., from 475° C. to 560° C., from 480° C. to 560° C., from 485° C. to 560° C., from 490° C. to 560° C., from 495° C. to 560° C., from 495° C. to 525° C., from 500° C. to 560° C., from 505° C. to 560° C., from 510° C. to 560° C., from 515° C. to 560° C., from 520° C. to 560° C., from 525° C. to 560° C., from 530° C. to 560° C., from 535° C. to 560° C., from 540° C. to 560° C., from 260° C. to 555° C., from 260° C. to 550° C., from 260° C. to 545° C., from 260° C. to 540° C., from 260° C. to 535° C., from 260° C. to 530° C., from 260° C. to 525° C., from 260° C. to 520° C., from 260° C. to 515° C., from 260° C. to 510° C., from 260° C. to 505° C., from 260° C. to 500° C., from 260° C. to 495° C., from 260° C. to 490° C., from 260° C. to 485° C., from 260° C. to 480° C., from 260° C. to 475° C., from 260° C. to 470° C., from 495° C. to 465° C., from 260° C. to 460° C., from 260° C. to 455° C., from 260° C. to 450° C., from 260° C. to 445° C., from 260° C. to 440° C., from 260° C. to 435° C., from 260° C. to 430° C., from 260° C. to 425° C., from 260° C. to 420° C., from 260° C. to 415° C., from 260° C. to 410° C., from 260° C. to 405° C., from 260° C. to 400° C., from 260° C. to 395° C., from 260° C. to 390° C., from 260° C. to 385° C., from 260° C. to 380° C., from 260° C. to 375° C., from 260° C. to 370° C., from 495° C. to 365° C., from 260° C. to 360° C., from 260° C. to 355° C., from 260° C. to 350° C., from 260° C. to 345° C., from 260° C. to 340° C., from 260° C. to 335° C., from 260° C. to 330° C., from 260° C. to 325° C., from 260° C. to 320° C., from 260° C. to 315° C., from 260° C. to 310° C., from 260° C. to 305° C., from 260° C. to 300° C., from 260° C. to 295° C., from 260° C. to 290° C., from 260° C. to 285° C., from 260° C. to 280° C., from 260° C. to 275° C., or even from 260° C. to 270° C.

In the same or other embodiments, the catalytic reforming unit may be operated at a pressure from 5 kg/cm² to 25 kg/cm², from 5 kg/cm² to 20 kg/cm², from 5 kg/cm² to 15 kg/cm², from 5 kg/cm² to 10 kg/cm², from 10 kg/cm² to 25 kg/cm², from 15 kg/cm² to 25 kg/cm², or even from 20 kg/cm² to 25 kg/cm². In the same or other embodiments, the catalytic reforming unit may be operated at a pressure from 0.1 MPa to 5 MPa, from 0.1 MPa to 4 MPa, from 0.1 MPa to 3 MPa, from 0.1 MPa to 2 MPa, from 0.5 MPa to 5 MPa, from 1 MPa to 5 MPa, from 2 MPa to 5 MPa, from 3 MPa to 5 MPa, or even from 4 MPa to 5 MPa.

In the same or other embodiments, the hydrogen-to-oil ratio within the catalytic reforming unit, on a volume basis, may be from 100 to 2500, from 100 to 2250, from 100 to 2000, from 100 to 1750, from 100 to 1500, from 100 to 1250, from 100 to 1000, from 100 to 750, from 100 to 500, from 250 to 2500, from 500 to 2500, from 750 to 2500, from 1000 to 2500, from 1250 to 2500, from 1500 to 2500, from 1750 to 2500, from 2000 to 2500, or even from 2250 to 2500.

In the same or other embodiments, the catalytic reforming unit may be operated with a LHSV from 0.5 h⁻¹ to 40 h⁻¹, from 0.5 h⁻¹ to 35 h⁻¹, from 0.5 h⁻¹ to 30 h⁻¹, from 0.5 h⁻¹ to 25 h⁻¹, from 0.5 h⁻¹ to 20 h⁻¹, from 0.5 h⁻¹ to 15 h⁻¹, from 0.5 h⁻¹ to 10 h⁻¹, from 0.5 h⁻¹ to 5 h⁻¹, from 0.5 h⁻¹ to 4 h⁻¹, from 1 h⁻¹ to 40 h⁻¹, from 4 h⁻¹ to 40 h⁻¹, from 5 h⁻¹ to 40 h⁻¹, from 10 h⁻¹ to 40 h⁻¹, from 15 h⁻¹ to 40 h⁻¹, from 20 h⁻¹ to 40 h⁻¹, from 25 h⁻¹ to 40 h⁻¹, from 30 h⁻¹ to 40 h⁻¹, or even from 35 h⁻¹ to 40 h⁻¹.

In embodiments, the aromatic recovery complex performs a xylene isomerization function and a xylene adsorption function. In embodiments, the aromatic recovery complex, during the xylene isomerization function, may be operated at a temperature from 250° C. to 550° C., from 270° C. to 550° C., from 280° C. to 550° C., from 290° C. to 550° C., from 300° C. to 550° C., from 300° C. to 500° C., from 310° C. to 550° C., from 320° C. to 550° C., from 330° C. to 550° C., from 340° C. to 550° C., from 350° C. to 550° C., from 360° C. to 550° C., from 370° C. to 550° C., from 370° C. to 440° C., from 380° C. to 550° C., from 390° C. to 550° C., from 400° C. to 550° C., from 410° C. to 550° C., from 420° C. to 550° C., from 430° C. to 550° C., from 440° C. to 550° C., from 450° C. to 550° C., from 455° C. to 550° C., from 460° C. to 550° C., from 465° C. to 550° C., from 470° C. to 550° C., from 475° C. to 550° C., from 480° C. to 550° C., from 485° C. to 550° C., from 490° C. to 550° C., from 495° C. to 550° C., from 500° C. to 550° C., from 505° C. to 550° C., from 510° C. to 550° C., from 515° C. to 550° C., from 520° C. to 550° C., from 525° C. to 550° C., from 530° C. to 550° C., from 535° C. to 550° C., from 540° C. to 550° C., from 250° C. to 550° C., from 250° C. to 545° C., from 250° C. to 540° C., from 250° C. to 535° C., from 250° C. to 530° C., from 250° C. to 525° C., from 250° C. to 520° C., from 250° C. to 515° C., from 250° C. to 510° C., from 250° C. to 505° C., from 250° C. to 500° C., from 250° C. to 495° C., from 250° C. to 490° C., from 250° C. to 485° C., from 250° C. to 480° C., from 250° C. to 475° C., from 250° C. to 470° C., from 495° C. to 465° C., from 250° C. to 460° C., from 250° C. to 455° C., from 250° C. to 450° C., from 250° C. to 445° C., from 250° C. to 440° C., from 250° C. to 435° C., from 250° C. to 430° C., from 250° C. to 425° C., from 250° C. to 420° C., from 250° C. to 415° C., from 250° C. to 410° C., from 250° C. to 405° C., from 250° C. to 400° C., from 250° C. to 395° C., from 250° C. to 390° C., from 250° C. to 385° C., from 250° C. to 380° C., from 250° C. to 375° C., from 250° C. to 370° C., from 495° C. to 365° C., from 250° C. to 360° C., from 250° C. to 355° C., from 250° C. to 350° C., from 250° C. to 345° C., from 250° C. to 340° C., from 250° C. to 335° C., from 250° C. to 330° C., from 250° C. to 325° C., from 250° C. to 320° C., from 250° C. to 315° C., from 250° C. to 310° C., from 250° C. to 305° C., from 250° C. to 300° C., from 250° C. to 295° C., from 250° C. to 290° C., from 250° C. to 285° C., from 250° C. to 280° C., from 250° C. to 275° C., from 250° C. to 270° C., from 250° C. to 265° C., or even from 250° C. to 260° C.

In the same or other embodiments, the aromatic recovery complex, during the xylene isomerization function, may be operated at a pressure from 1 MPa to 3 MPa, from 1 MPa to 2 MPa, from 1 MPa to 1.5 MPa, from 1 MPa to 1.2 MPa, from 1.2 MPa to 3 MPa, from 1.5 MPa to 3 MPa, from 2 MPa to 3 MPa, or even from 2.5 MPa to 3 MPa.

In the same or other embodiments, the hydrogen-to-oil ratio within the aromatic recovery complex during the xylene isomerization function, on a molar basis, may be from 1 to 5, from 1 to 4, from 1 to 3, from 1 to 2, or even 1:1.

In the same or other embodiments, the aromatic recovery complex, during the xylene isomerization function, may be operated with a LHSV from 8 $h^{-1}$ to 30 $h^{-1}$, from 8 $h^{-1}$ to 25 $h^{-1}$, from 8 $h^{-1}$ to 20 $h^{-1}$, from 8 $h^{-1}$ to 15 $h^{-1}$, from 8 $h^{-1}$ to 10 $h^{-1}$, from 10 $h^{-1}$ to 30 $h^{-1}$, from 10 $h^{-1}$ to 20 $h^{-1}$, from 11 $h^{-1}$ to 30 $h^{-1}$, from 12 $h^{-1}$ to 30 $h^{-1}$, from 13 $h^{-1}$ to 30 $h^{-1}$, from 14 $h^{-1}$ to 30 $h^{-1}$, from 15 $h^{-1}$ to 30 $h^{-1}$, from 16 $h^{-1}$ to 30 $h^{-1}$, from 17 $h^{-1}$ to 30 $h^{-1}$, from 18 $h^{-1}$ to 30 $h^{-1}$, from 19 $h^{-1}$ to 30 $h^{-1}$, or even from 20 $h^{-1}$ to 30 $h^{-1}$.

In embodiments, the aromatic recovery complex, during the xylene adsorption function, may be operated at a temperature from 80° C. to 250° C., from 85° C. to 250° C., from 90° C. to 95° C., from 100° C. to 250° C., from 100° C. to 225° C., from 105° C. to 250° C., from 110° C. to 500° C., from 115° C. to 250° C., from 120° C. to 250° C., from 125° C. to 250° C., from 130° C. to 250° C., from 135° C. to 250° C., from 140° C. to 250° C., from 145° C. to 250° C., from 150° C. to 440° C., from 150° C. to 200° C., from 155° C. to 250° C., from 160° C. to 250° C., from 170° C. to 250° C., from 175° C. to 250° C., from 180° C. to 250° C., from 185° C. to 250° C., from 190° C. to 250° C., from 195° C. to 250° C., from 200° C. to 250° C., from 205° C. to 250° C., from 210° C. to 250° C., from 215° C. to 250° C., from 220° C. to 250° C., from 225° C. to 250° C., from 230° C. to 250° C., from 235° C. to 250° C., from 240° C. to 250° C., from 80° C. to 245° C., from 80° C. to 240° C., from 80° C. to 235° C., from 80° C. to 230° C., from 80° C. to 225° C., from 80° C. to 220° C., from 80° C. to 215° C., from 80° C. to 210° C., from 80° C. to 205° C., from 80° C. to 200° C., from 80° C. to 195° C., from 80° C. to 190° C., from 80° C. to 185° C., from 80° C. to 180° C., from 80° C. to 175° C., from 80° C. to 170° C., from 495° C. to 165° C., from 80° C. to 160° C., from 80° C. to 155° C., from 80° C. to 150° C., from 80° C. to 445° C., from 80° C. to 140° C., from 80° C. to 135° C., from 80° C. to 130° C., from 80° C. to 125° C., from 80° C. to 120° C., from 80° C. to 115° C., from 80° C. to 110° C., from 80° C. to 105° C., from 80° C. to 100° C., from 80° C. to 95° C., or even from 80° C. to 90° C.

In the same or other embodiments, the aromatic recovery complex, during the xylene adsorption function, may be operated at a pressure from 0.1 MPa to 2 MPa, from 0.1 MPa to 1.9 MPa, from 0.1 MPa to 1.8 MPa, from 0.1 MPa to 1.7 MPa, from 0.1 MPa to 1.6 MPa, from 0.1 MPa to 1.5 MPa, from 0.1 MPa to 1.4 MPa, 0.1 MPa to 1.3 MPa, from 0.1 MPa to 1.2 MPa, from 0.1 MPa to 1.1 MPa, from 0.1 MPa to 1 MPa, from 0.1 MPa to 0.9 MPa, from 0.1 MPa to 0.8 MPa, from 0.1 MPa to 0.7 MPa, from 0.1 MPa to 0.6 MPa, from 0.1 MPa to 0.5 MPa, from 0.1 MPa to 0.4 MPa, from 0.1 MPa to 0.3 MPa, from 0.1 MPa to 0.2 MPa, 0.2 MPa to 2 MPa, from 0.3 MPa to 2 MPa, from 0.4 MPa to 2 MPa, from 0.5 MPa to 2 MPa, from 0.6 MPa to 2 MPa, from 0.7 MPa to 2 MPa, from 0.8 MPa to 2 MPa, 0.9 MPa to 2 MPa, from 1 MPa to 2 MPa, from 1.1 MPa to 2 MPa, from 1.2 MPa to 2 MPa, from 1.3 MPa to 2 MPa, from 1.4 MPa to 2 MPa, from 1.5 MPa to 2 MPa, from 1.6 MPa to 2 MPa, from 1.7 MPa to 2 MPa, from 1.8 MPa to 2 MPa, or even from 1.9 MPa to 2 MPa.

In the same or other embodiments, the aromatic recovery complex, during the xylene adsorption function, may be operated with a LHSV from 0.1 $h^{-1}$ to 2 $h^{-1}$, from 0.1 $h^{-1}$ to 1.5 $h^{-1}$, from 0.1 $h^{-1}$ to 1 $h^{-1}$, from 0.1 $h^{-1}$ to 0.5 $h^{-1}$, from 0.5 $h^{-1}$ to 2 $h^{-1}$, from 1 $h^{-1}$ to 2 $h^{-1}$, or even from 1.5 $h^{-1}$ to 2 $h^{-1}$.

The adsorption zone(s) used in the process and apparatus described herein is, in certain embodiments, at least two packed bed columns which are gravity fed or pressure force-fed sequentially in order to permit continuous operation when one bed is being regenerated, i.e., swing mode operation. The columns contain an effective quantity of adsorbent material, such as attapulgus clay, alumina, silica gel silica-alumina, titania, fresh or spent catalysts, or activated carbon. The packing can be in the form of pellets, spheres, extrudates, natural shapes, or any combination thereof, having an average size of 4 mesh to 60 mesh, and in certain embodiments 4 mesh to 20 mesh, based on United States Standard Sieve Series.

The packed columns are generally operated at a pressure in the range of from 1 kg/cm² to 30 kg/cm², in certain embodiments 1 kg/cm² to 20 kg/cm², and in further embodiments 1 kg/cm² to 10 kg/cm², a temperature in the range of from 20° C. to 250° C., in certain embodiments 20° C. to 150° C., and in further embodiments 20° C. to 100° C.; and a liquid hourly space velocity of 0.1 $h^{-1}$ to 10 $h^{-1}$, in certain embodiments 0.25 $h^{-1}$ to 5 $h^{-1}$, and in further embodiments 0.5 $h^{-1}$ to about 2 $h^{-1}$. The aromatic bottoms stream may have an overall Hildebrand solubility parameter from 19 to 22. For instance the aromatic bottoms stream may have a Hildebrand solubility factor of 19, 20, 21, 22, or any fractional part thereof, or the Hildebrand solubility factor may be from 19 to 21, from 19 to 20, from 20 to 22, from 20 to 21, or even from 21 to 22.

Advantageously, the processes and systems described herein allow for the reduction of the concentrations of nitrogen-containing compounds, sulfur-containing compounds, and PNA compounds in a heavy feedstream to a hydrocracking unit such as a DMO or DAO feedstream by adsorbing the undesirable compounds on an adsorbent. Saturated adsorbent can then be recycled by desorbing the unwanted compounds using an aromatic bottoms stream from an aromatic recovery complex. In addition, in recycle hydrocracking operations, the concentration of PNA compounds that are formed in the unconverted fractionator bottoms is reduced. Accordingly, the overall efficiency of operation of the hydrocracking unit is improved along with the effluent product quality.

According to an aspect, either alone or in combination with any other aspect, a process for treating a hydrocarbon feedstream, the hydrocarbon feedstream comprising nitrogen-containing compounds and polynuclear aromatic compounds, includes: (i) contacting the hydrocarbon feedstream with an adsorbent material to produce an adsorbent having an increased content of nitrogen-containing compounds and polynuclear compounds and an adsorbent-treated hydrocarbon feedstream having a decreased content of nitrogen-containing compounds and polynuclear aromatic compounds; (ii) introducing the adsorbent-treated hydrocarbon feedstream to a hydrocracking reaction unit to produce a hydrocracked effluent stream; (iii) introducing a naphtha stream to a catalytic reforming unit to produce a reformate stream; (iv) introducing the reformate stream to an aromatic recovery complex to produce a light reformate stream, a benzene-toluene-xylene (BTX) stream, and an aromatic bottoms stream; and (v) introducing the aromatic bottoms stream to the adsorbent having an increased content of nitrogen-containing compounds and polynuclear compounds to produce an adsorbent having a decreased content of nitrogen-containing compounds and polynuclear compounds and an aromatic bottoms stream having an increased content of nitrogen-containing compounds and polynuclear aromatic compounds.

According to a second aspect, either alone or in combination with any other aspect, the reformate stream comprises aromatics, alkyl aromatics, naphthenes, olefins, and isoparaffins.

According to a third aspect, either alone or in combination with any other aspect, the aromatics bottoms stream has a Hildebrand solubility factor of at least 19 $MPa^{1/2}$.

According to a fourth aspect, either alone or in combination with any other aspect, the adsorbent material is selected from the group consisting of attapulgus clay, alumina, silica, titania, activated carbon, fresh solid catalyst, spent solid catalyst, and a combination of two or more thereof.

According to a fifth aspect, either alone or in combination with any other aspect, the hydrocarbon feedstream is selected from the group consisting of vacuum gas oil, de-metalized oil, de-asphalted oil, coker gas oil, cycle oils, visbroken oil, coal liquids, bio-oils, and a combination of two or more thereof.

According to a sixth aspect, either alone or in combination with any other aspect, the aromatic bottoms stream comprises at least one compound selected from the group consisting of alkylated mono-aromatics, uncondensed bridged di-aromatics, condensed di-aromatics, alkylated mono-aromatics, and mixtures of two or more thereof.

According to a seventh aspect, either alone or in combination with any other aspect, the process further includes conveying the aromatic bottoms stream having an increased content of nitrogen-containing compounds and polynuclear aromatic compounds to a fuel oil pool or other process units to recover the aromatic bottoms stream and the nitrogen-containing compounds and polynuclear aromatic compounds.

According to an eighth aspect, either alone or in combination with any other aspect, the polynuclear aromatic compounds comprise heavy polynuclear aromatic compounds having seven or more fused aromatic rings.

According to a ninth aspect, either alone or in combination with any other aspect, the hydrocracking reaction unit performs single-stage once through hydrocracking, series flow hydrocracking with recycle, series flow hydrocracking without recycle, or two stage recycle hydrocracking to produce the hydrocracked effluent stream.

According to a tenth aspect, either alone or in combination with any other aspect, the adsorbent material is in the form of pellets, spheres, extrudates, or natural shapes and has a size in the range of 4-60 mesh.

According to an eleventh aspect, either alone or in combination with any other aspect, the process does not comprise a solvent desorption step to produce an adsorbent having a decreased content of nitrogen-containing compounds and polynuclear compounds and an aromatic bottoms stream having an increased content of nitrogen-containing compounds and polynuclear aromatic compounds.

According to a twelfth aspect, either alone or in combination with any other aspect, the process further includes introducing the hydrocracked effluent stream to a high pressure separation zone to produce a degassed effluent stream; introducing the degassed effluent stream to a fractionating zone to produce at least one hydrocarbon fraction comprising nitrogen-containing compounds and polynuclear compounds; and contacting the at least one hydrocarbon fraction comprising nitrogen-containing compounds and polynuclear compounds with an adsorbent material to produce an adsorbent having an increased content of nitrogen-containing compounds and polynuclear compounds and a second adsorbent-treated hydrocarbon feedstream having a decreased content of nitrogen-containing compounds and polynuclear aromatic compounds.

According to a thirteenth aspect, either alone or in combination with any other aspect, a system for treating a hydrocarbon feedstream, the hydrocarbon feedstream comprising nitrogen-containing compounds and polynuclear aromatic compounds, including: an adsorption zone comprising an adsorbent material for adsorbing at least a portion of the nitrogen-containing compounds and polynuclear aromatic compounds thereby converting the hydrocarbon feedstream into an adsorbent-treated hydrocarbon feedstream having a decreased content of nitrogen-containing compounds and polynuclear aromatic compounds; an aromatic recovery complex for producing an aromatic bottoms stream, the aromatic recovery complex having an outlet that is fluidly coupled to an inlet of the adsorption zone; and a conduit in fluid communication with the outlet of the aromatic recovery complex and the inlet of the adsorption zone for conveying at least a portion of the aromatic bottoms stream to the adsorption zone for desorbing the nitrogen-containing compounds and polynuclear aromatic compounds from the adsorbent materials.

According to a fourteenth aspect, either alone or in combination with any other aspect, the aromatics bottoms stream has a Hildebrand solubility factor greater than 19.

According to a fifteenth aspect, either alone or in combination with any other aspect, the aromatics bottoms stream has a Hildebrand solubility factor from 19 to 22.

According to a sixteenth aspect, either alone or in combination with any other aspect, the adsorbent material is selected from the group consisting of attapulgus clay, alumina, silica, titania, activated carbon, fresh solid catalyst, spent solid catalyst, and a combination of two or more thereof.

According to a seventeenth aspect, either alone or in combination with any other aspect, the hydrocarbon feedstream is selected from the group consisting of vacuum gas oil, de-metalized oil, de-asphalted oil, coker gas oil, cycle oils, visbroken oil, coal liquids, bio-oils, and a combination of two or more thereof.

According to an eighteenth aspect, either alone or in combination with any other aspect, the aromatic bottoms stream comprises at least one compound selected from the group consisting of alkylated mono-aromatics, uncondensed bridged di-aromatics, condensed di-aromatics, alkylated mono-aromatics, and mixtures of two or more thereof.

According to a nineteenth aspect, either alone or in combination with any other aspect, the polynuclear aromatic compounds comprise heavy polynuclear aromatic compounds having seven or more fused aromatic rings.

According to a twentieth aspect, either alone or in combination with any other aspect, the adsorbent material is in the form of pellets, spheres, extrudates, or natural shapes and has a size in the range of 4-60 mesh.

Example

Using embodiments described above, an exemplary hydrocracking pilot plant test was conducted, as follows. The following examples are merely illustrative and should not be interpreted as limiting the scope of the present disclosure.

50 grams of a hydrocracking unit recycle stream containing 4006 ppm by weight HPNA was treated in an adsorption column containing 5.03 g of Attapulgus clay. After collecting the treated material, the column was washed with 50 grams pentane to elute PNA hydrocarbons from the adsorption column, followed by 50 grams of aromatic bottoms stream to elute the HPNA, and then by 50 grams of tetrahydrofuran to elute residual aromatic bottoms. The material balance and HPNA content of the stream is shown in Table 2. As seen, the aromatic bottoms stream was able to desorb the majority of the HPNA from the adsorbents.

TABLE 2

Material balance and HPNA content of the feedstream and stream out

| In-Out | Component | g | HPNA (ppmw) | HPNA (g) |
|---|---|---|---|---|
| In | Feedstream | 50.0 | 4006 | 0.2003 |
| In | Total In | 50.0 | 4006 | 0.2003 |
| Out | Treated feedstream | 48.2 | 3747 | 0.1808 |
| Out | Aromatic Bottoms | 47.6 | 265.4 | 0.0126 |
| Out | Tetrahydrofuran fraction | 8.4 | 40.5 | 0.0020 |
| Out | Total Out | | | 0.1954 |

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A process for treating a hydrocarbon feedstream, the hydrocarbon feedstream comprising nitrogen-containing compounds and polynuclear aromatic compounds, the process comprising:
   (i) contacting the hydrocarbon feedstream with an adsorbent material to produce an adsorbent having an increased content of nitrogen-containing compounds and polynuclear compounds and an adsorbent-treated hydrocarbon feedstream having a decreased content of nitrogen-containing compounds and polynuclear aromatic compounds;
   (ii) introducing the adsorbent-treated hydrocarbon feedstream to a hydrocracking reaction unit to produce a hydrocracked effluent stream;
   (iii) introducing a naphtha stream to a catalytic reforming unit to produce a reformate stream;
   (iv) introducing the reformate stream to an aromatic recovery complex to produce a light reformate stream, a benzene-toluene-xylene (BTX) stream, and an aromatic bottoms stream; and
   (v) introducing the aromatic bottoms stream to the adsorbent having an increased content of nitrogen-containing compounds and polynuclear compounds to produce an adsorbent having a decreased content of nitrogen-containing compounds and polynuclear compounds and an aromatic bottoms stream having an increased content of nitrogen-containing compounds and polynuclear aromatic compounds.

2. The process of claim 1, wherein the reformate stream comprises aromatics, alkyl aromatics, naphthenes, olefins, and iso-paraffins.

3. The process of claim 1, wherein the aromatics bottoms stream has a Hildebrand solubility factor of at least 19 $MPa^{1/2}$.

4. The process of claim 1, wherein the adsorbent material is selected from the group consisting of attapulgus clay, alumina, silica, titania, activated carbon, fresh solid catalyst, spent solid catalyst, and a combination of two or more thereof.

5. The process of claim 1, wherein the hydrocarbon feedstream is selected from the group consisting of vacuum gas oil, de-metalized oil, de-asphalted oil, coker gas oil, cycle oils, visbroken oil, coal liquids, bio-oils, and a combination of two or more thereof.

6. The process of claim 1, wherein the aromatic bottoms stream comprises at least one compound selected from the group consisting of alkylated mono-aromatics, uncondensed bridged di-aromatics, condensed di-aromatics, alkylated mono-aromatics, and mixtures of two or more thereof.

7. The process of claim 1, further comprising conveying the aromatic bottoms stream having an increased content of nitrogen-containing compounds and polynuclear aromatic compounds to a fuel oil pool or other process units to recover the aromatic bottoms stream and the nitrogen-containing compounds and polynuclear aromatic compounds.

8. The process of claim 1, wherein the polynuclear aromatic compounds comprise heavy polynuclear aromatic compounds having seven or more fused aromatic rings.

9. The process of claim 1, wherein the hydrocracking reaction unit performs single-stage once through hydrocracking, series flow hydrocracking with recycle, series flow hydrocracking without recycle, or two stage recycle hydrocracking to produce the hydrocracked effluent stream.

10. The process of claim 1, wherein the adsorbent material is in the form of pellets, spheres, extrudates, or natural shapes and has a size in the range of 4-60 mesh.

11. The process of claim 1, wherein the process does not comprise a solvent desorption step to produce an adsorbent having a decreased content of nitrogen-containing compounds and polynuclear compounds and an aromatic bottoms stream having an increased content of nitrogen-containing compounds and polynuclear aromatic compounds.

12. The process of claim 1, further comprising:
 introducing the hydrocracked effluent stream to a high pressure separation zone to produce a degassed effluent stream;
 introducing the degassed effluent stream to a fractionating zone to produce at least one hydrocarbon fraction comprising nitrogen-containing compounds and polynuclear compounds; and
 contacting the at least one hydrocarbon fraction comprising nitrogen-containing compounds and polynuclear compounds with an adsorbent material to produce an adsorbent having an increased content of nitrogen-containing compounds and polynuclear compounds and a second adsorbent-treated hydrocarbon feedstream having a decreased content of nitrogen-containing compounds and polynuclear aromatic compounds.

\* \* \* \* \*